(12) United States Patent
Yun et al.

(10) Patent No.: US 10,552,481 B2
(45) Date of Patent: Feb. 4, 2020

(54) METHOD AND DEVICE FOR GENERATING A LIST OF VIDEO FILES

(71) Applicant: Guangzhou Cheetah Network Technology Co., Ltd., Guangzhou, Guangdong (CN)

(72) Inventors: Feng Yun, Beijing (CN); Shaocong Ouyang, Beijing (CN)

(73) Assignee: Guangzhou Cheetah Network Technology Co., Ltd.

( * ) Notice: Subject to any disclaimer, the term of this patent is extended or adjusted under 35 U.S.C. 154(b) by 500 days.

(21) Appl. No.: 15/321,390

(22) PCT Filed: Jun. 23, 2015

(86) PCT No.: PCT/CN2015/082102
§ 371 (c)(1),
(2) Date: Dec. 22, 2016

(87) PCT Pub. No.: WO2015/196977
PCT Pub. Date: Dec. 30, 2015

(65) Prior Publication Data
US 2017/0199885 A1 Jul. 13, 2017

(30) Foreign Application Priority Data
Jun. 24, 2014 (CN) .......................... 2014 1 0290919

(51) Int. Cl.
*G06F 16/738* (2019.01)
*G06F 16/78* (2019.01)
(52) U.S. Cl.
CPC ............ *G06F 16/738* (2019.01); *G06F 16/78* (2019.01)
(58) Field of Classification Search
CPC ...... G06F 16/738; G06F 16/78; G06F 3/0482; G06F 16/245; G06F 16/248;
(Continued)

(56) References Cited

U.S. PATENT DOCUMENTS

2015/0019550 A1* 1/2015 Maharajh ............... G06Q 10/10
707/736
2015/0100578 A1* 4/2015 Rosen .................. G06F 17/2247
707/737

FOREIGN PATENT DOCUMENTS

CN 102289481 A 12/2011
CN 102467546 A 5/2012
(Continued)

OTHER PUBLICATIONS

PCT/CN2015/082102, Aug. 24, 2015, International Search Report.
(Continued)

*Primary Examiner* — Evan Aspinwall
(74) *Attorney, Agent, or Firm* — Wolf, Greenfield & Sacks, P.C.

(57) ABSTRACT

A method and device for generating a list of video files, which are applied to a mobile terminal. The method comprises: when video files are imported in a mobile terminal, invoking a system interface program of the mobile terminal to scan the imported video files; if scanning is successful, obtaining attribute information about the video files through the system interface program, and storing same in a system database of the mobile terminal; if scanning is not successful, invoking a custom interface program, obtaining the attribute information about the video files, and storing same in a custom database; when it is required to generate a list of video files, obtaining the stored attribute information about the various video files from the system database and the custom database respectively; based on the attribute information about the various video files obtained from the system database and the custom database, generating the list of video files. By means of the list of video files acquired in the embodiments of the present application, all video files in a mobile terminal can be reflected.

10 Claims, 3 Drawing Sheets

(58) Field of Classification Search
CPC ........... G06F 16/7867; G06F 16/24575; G06F 16/335; G06F 16/48; G06F 3/0481; G06F 3/1292; G06F 16/24578; G06F 16/338; G06F 16/5838; G06F 16/634; G06F 16/686; G06F 16/7834; G06F 16/164; G06F 16/358; G06F 16/438; G06F 16/583; G06F 16/638; G06F 16/64; G06F 16/683; G06F 16/903; G06F 3/048; G06F 3/1226; G06F 16/58; G06F 16/148; G06F 16/10; G06F 16/156; G06F 16/168; G06F 16/1794; G06F 16/44; G06F 16/68
USPC ........................................................ 707/722
See application file for complete search history.

(56) References Cited

FOREIGN PATENT DOCUMENTS

| | | | |
|---|---|---|---|
| CN | 102543122 | A | 7/2012 |
| CN | 103473341 | A | 12/2013 |
| CN | 103744912 | A | 4/2014 |
| CN | 103763625 | A | 4/2014 |

OTHER PUBLICATIONS

CN2014102909199, Jun. 24, 2014, Chinese Search Report.
Chinese Search Report for Chinese Application No. 2014102909199 dated Jul. 24, 2014.
International Search Report for Application No. PCT/CN2015/082102, dated Aug. 24, 2015.
Jingwen3699. Jul. 24, 2012. 3 pages.

* cited by examiner

METHOD AND DEVICE FOR GENERATING A LIST OF VIDEO FILES

CROSS-REFERENCE TO RELATED APPLICATIONS

This application is the national phase of International Application No. PCT/CN2015/082102, titled "METHOD AND DEVICE FOR GENERATING A LIST OF VIDEO FILES", filed on Jun. 23, 2015, which claims priority to Chinese Patent Application No. 201410290919.9, entitled "METHOD AND DEVICE FOR GENERATING LIST OF VIDEO FILES", filed with the Chinese State Intellectual Property Office on Jun. 24, 2014, which applications are hereby incorporated by reference to the maximum extent allowable by law.

TECHNICAL FIELD

The present application relates to a technical field of managing a video file by a mobile terminal, and in particular, to a method and device for generating a list of video files.

BACKGROUND ART

Nowadays, a mobile terminal typically uses computer end tools installed in a computer connected thereto to manage a video file. For example, for a mobile terminal with Android System, after connecting to a computer via a data line, the computer end tools installed in the computer may import video files to the mobile terminal and inform the mobile terminal. After the mobile terminal scans the imported video files, it stores attribute information and playing information about the video files imported by the computer end tools in a system database. When obtaining a list of video files, from the system database, the playing information and the attribute information about each video file stored therein is obtained, thereby generating the list of video files for display. Users may operate the list of video files to achieve the operations on video files such as playback, delete, etc.

However, when a mobile terminal scans the imported video files, only the video files that can be supported by the system of the mobile terminal can be scanned, and the playing information and the attribute information about these video files is further obtained and stored in the system database. A list of video files can only reflect the video file information stored in the database. For the imported video files that cannot be supported by the system of the mobile terminal, the playing information and the attribute information about these video files cannot be obtained in the way of scanning the videos by the mobile terminal, and thereby the information cannot be stored in the system database, as a result the list of video files cannot reflect these video files.

It can be seen that the video files list in the prior art cannot reflect all video files in a mobile terminal. A user cannot operate all video files by a list of video files, which results in inconvenient for use.

SUMMARY OF INVENTION

In view of this, the purpose of embodiments of the present application is to provide a method and device for generating a list of video files, thereby enabling a list of video files to reflect all video files in a mobile terminal. To achieve the above objectives, the present application discloses a method for generating a list of video files, which is applicable to a mobile terminal, and the method comprises:

when video files are imported into a mobile terminal, invoking a system interface program of the mobile terminal to scan the imported video files;

if the scanning is successful, obtaining attribute information of the video files through the system interface program, and storing the same in a system database of the mobile terminal;

if the scanning is not successful, invoking a custom interface program to obtain the attribute information of the video files, and storing the same in a custom database;

when it is required to generate a list of video files, obtaining the stored attribute information of the respective video files from the system database and the custom database respectively; and generating a list of video files based on the attribute information of the respective video files obtained from the system database and the custom database.

Wherein, the step of invoking a custom interface program to obtain the attribute information of the video files comprises:

invoking a custom interface program to use a public interface function for obtaining the attribute information of the video files.

The custom database can be created by the custom interface program.

The step of storing in a custom database can comprise:

determining whether the custom database is created; if yes, storing the obtained attribute information of the video files in the custom database; and if not, after the custom database is created by the custom interface program, storing the obtained attribute information of the video files in the custom database.

The step of generating a list of video files based on the attribute information of the respective video files obtained from the system database and the custom database can comprise:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database.

The attribute information of the video files comprises at least: path information of the video files and/or names of the video files.

The present application also discloses a device for obtaining a list of video files by a mobile terminal, which is applicable to a mobile terminal, and the device comprises:

an information storage unit for, when video files are imported into a mobile terminal, invoking a system interface program of the mobile terminal to scan the imported video files;

if the scanning is successful, obtaining attribute information of the video files through the system interface program, and storing the same in a system database of the mobile terminal; and if the scanning is not successful, invoking a custom interface program to obtain the attribute information of the video files, and storing the same in a custom database; and a video file list generation unit for, when it is required to generate a list of video files, obtaining the stored attribute information of the respective video files from the system database and the custom database respectively; and generating a list of video files based on the attribute information of the respective video files obtained from the system database and the custom database.

Wherein, the information storage unit can comprise: a scanning sub-unit, a first information storage sub-unit and a second information storage sub-unit, wherein the scanning sub-unit is used for, when the video files are imported into the mobile terminal, invoking the system interface program of the mobile terminal to scan the imported video files;

the first information storage sub-unit is used for, if the scanning is successful, obtaining the attribute information of the video files through the system interface program, and storing the same in the system database of the mobile terminal; and the second information storage sub-unit is used for, if the scanning is not successful, invoking the custom interface program to obtain the attribute information of the video files, and storing the same in the custom database.

The second information storage sub-unit can comprise: an attribute information obtaining sub-unit and a custom database storage sub-unit, wherein the attribute information obtaining sub-unit is used for invoking the custom interface program to use a public interface function for obtaining the attribute information of the video files; and the custom database storage sub-unit is used for determining whether the custom database is created; if yes, storing the obtained attribute information of the video files in the custom database; if not, after the custom database is created by the custom interface program, storing the obtained attribute information of the video files in the custom database.

The video file list generation unit may comprise: an information obtaining sub-unit and a video file list generation sub-unit, wherein the information obtaining sub-unit is used for, when it is required to generate a list of video files, obtaining the stored attribute information of the respective video files from the system database and the custom database respectively; and the video file list generation sub-unit is used for generating the list of video files based on the attribute information of the respective video files obtained from the system database and the custom database.

The video file list generation sub-unit generates the list of video files in an order of the attribute information of the video files obtained from the system database being followed by the attribute information of the video files obtained from the custom database; or generates the list of video files in an order of the attribute information of the video files obtained from the custom database being followed by the attribute information of the video files obtained from the system database; or generates the list of video files ordered according to a certain kind of preset attribute information in the attribute information of the respective video files obtained from the system database and the custom database.

The attribute information of the video files comprises at least: path information of the video files and/or names of the video files.

Embodiments of the present application also disclose a mobile terminal, which comprises: a processor, a memory, communication interfaces and a bus;

the processor, the memory and the communication interfaces are connected and communicate via the bus with each other;

the memory stores executable codes;

the processor carries out a program corresponding to the executable codes by reading the executable codes stored in the memory to perform a method for generating a list of video files provided by the embodiments of the present application.

Embodiments of the present application also disclose a storage medium for storing application programs, which are used for performing a method for generating a list of video files provided by the embodiments of the present application.

Embodiments of the present application also disclose an application program, which is used for performing a method for generating a list of video files.

From the above technical solution, it can be seen that the method and device for obtaining a list of video files by a mobile terminal provided by the embodiments of the present application, for a video file which cannot be successfully scanned, invoke a custom interface program, obtain the attribute information about the video files, and store same in a custom database; when obtaining a list of video files, the list of video files is generated based on the attribute information about the various video files obtained from the system database and the custom database. In this way, by means of the list of video files acquired in the embodiments of the present application, not only the video files, which can be scanned successfully by a system, but also the video files, which cannot be scanned successfully by a system, can be reflected, that is to say, a list of video files can reflect all video files in a mobile terminal. A user can operate all video files by a list of video files, thereby the use thereof is convenient.

Any product or process of the implementation of the present application will not necessarily meet all the advantages at the same time.

BRIEF DESCRIPTION OF DRAWINGS

In order to describe the technical solution of the embodiments of the present application or in the prior art more clearly, in the following, a brief description with reference to the accompanying drawings required for the embodiments description will be given, because the drawings in the following description are some embodiments of the present application, it is obvious for those ordinary skilled in the art to obtain other drawings in accordance with these accompanying drawings without any inventive efforts.

DETAILED DESCRIPTION OF EMBODIMENTS

In order to describe the purpose, the technical solution and the advantages of the present application more clearly, in the following, the present application are further described in detail with reference to the accompanying drawings. It is obvious that the described embodiments are a part of embodiments of the present application, but not the entire ones. Based on the embodiments of the present application, all of other embodiments obtained by those ordinary skilled in the art without any inventive efforts are within the scope protected by the present application.

The embodiments of the present application disclose a method and device for generating a list of video files, which will be described in detail respectively hereafter.

Figure 1:
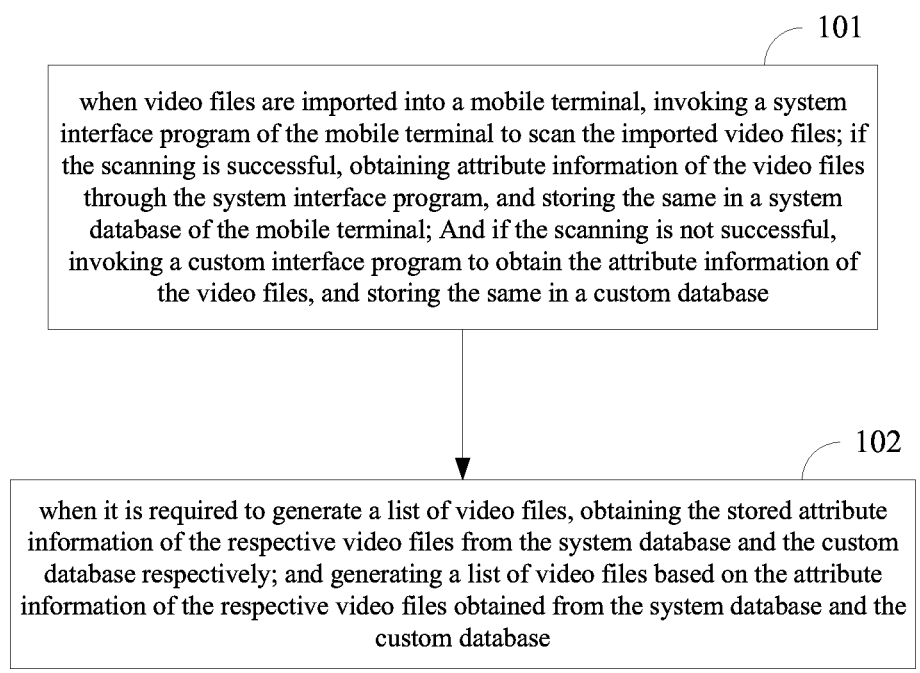
FIG. 1 is a flowchart of a method for generating a list of video files in accordance with embodiments of the present application.

Referring to FIG. 1, a flowchart of a method for generating a list of video files provided by the embodiments of the present application is shown. The method comprises following steps.

In step 101, when video files are imported into a mobile terminal, a system interface program of the mobile terminal is invoked to scan the imported video files; if the scanning is successful, attribute information of the video files is obtained through the system interface program, and is stored in a system database of the mobile terminal; and if the scanning is not successful, a custom interface program is invoked to obtain the attribute information of the video files, and store the same in the custom database.

In step 102, when it is required to generate a list of video files, the stored attribute information of the respective video files is obtained from the system database and the custom database respectively; and a list of video files is generated based on the attribute information of the respective video files obtained from the system database and the custom database.

Generally, the attribute information of a video file may comprise at least: path information of the video file and/or a name of the video file. In practical application, it may also comprise size information of the video file and/or type information of the video file and so on.

In particular, for a mobile terminal with Android system, after video files are imported, a system interface program will be invoked to scan the video files. It is simple to implement the scanning of video files on the mobile terminal with Android system. The video files newly imported on a mobile terminal can be scanned directly by a MediaScannerConnection class provided by the Android system. If the scanning is successful, the attribute information and the playing information of the video files is then stored in a system database, which is used for storing videos, of the Android system. If the scanning is not successful, a preset first custom interface program is invoked, for example: presetting a custom implementation class SelfVideoSave, which is able to obtain attribute information of a video files by invoking some public interface functions, and then storing the same in a first custom database created by itself. Certainly, in practical application, the custom database is not necessarily created by the foregoing custom interface program, it is also possible to preset a custom database to store attribute information about video files. The use of a public interface function by invoking to obtain attribute information about video files belongs to the prior art, thereby no detailed description is made hereto in the present application.

When generating a list of video files, the list of video files is generated based on the attribute information of the various video files obtained from the system database and the custom database.

It can be seen that, a list of video files generated by applying the embodiments of the present application can not only reflect the video files, to which the scanning by system is successful, but also the video files, to which the scanning by system is not successful. That is to say, the list of video files can reflect all video files in a mobile terminal. A user can operate all video files by a list of video files, thereby the use thereof is convenient.

Figure 2:
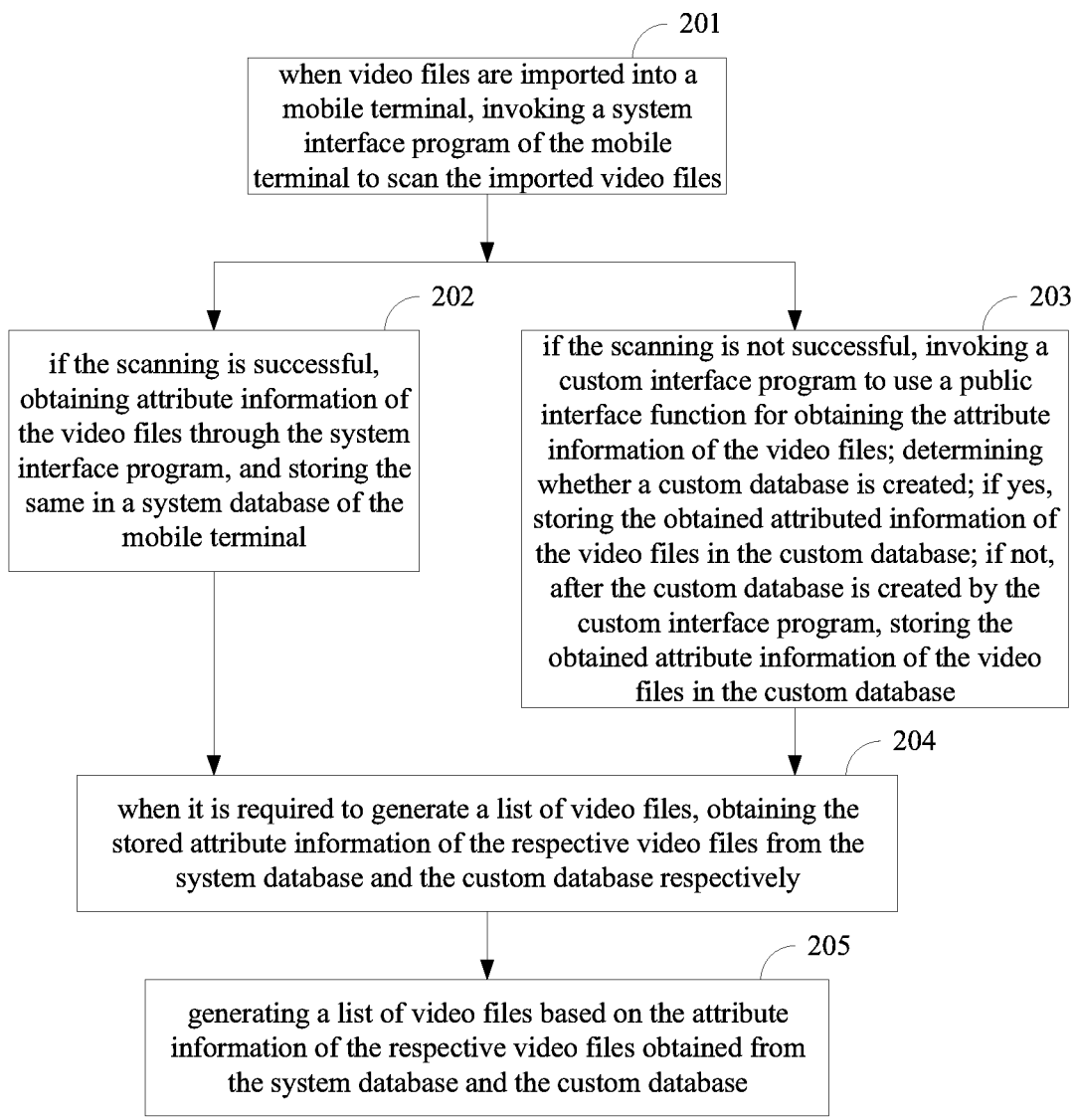
FIG. 2 is another flowchart of a method for generating a list of video files in accordance with embodiments of the present application.

Referring to FIG. 2, another flowchart of a method for generating a list of video files in accordance with the embodiments of the present application is shown, wherein the flow is applicable in a mobile terminal. The method comprises the following steps.

In step 201, when video files are imported into a mobile terminal, a system interface program of the mobile terminal is invoked to scan the imported video files.

In step 202, if the scanning is successful, attribute information of the video files is obtained through the system interface program, and is stored in a system database of the mobile terminal.

In step 203, if the scanning is not successful, a custom interface program is invoked to use a public interface function for obtaining the attribute information of the video files; determining whether a custom database is created; if yes, storing the obtained attributed information of the video files in the custom database; if not, after the custom database is created by the custom interface program, storing the obtained attribute information of the video files in the custom database.

In this step, a specific implementation method of obtaining attribute information of video files and storing the same in a custom database, and in practical application, other methods can be used to achieve the same.

For example, a custom database may be created in advance, or may be created by the custom interface program when the first scanning to the video files is not successful. The specific creation method belongs to the prior art, thereby no detailed description is made hereto in the present application.

In step 204, when it is required to generate a list of video files, the stored attribute information of the respective video files is obtained from the system database and the custom database respectively.

In step 205, a list of video files is generated based on the attribute information of the respective video files obtained from the system database and the custom database.

In practical application, there may be various implementation methods for generating a list of video files, for example:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database, and so on.

It can be seen that the list of video files generated in this way can reflect all video files in a mobile terminal. A user can operate all video files by a list of video files, thereby the use thereof is convenient.

Figure 3:
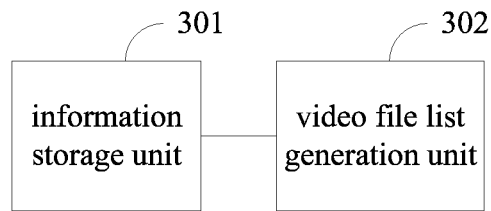
FIG. 3 is a structural diagram of a device for generating a list of video files in accordance with embodiments of the present application.

Referring to FIG. 3, a structural diagram of a device for generating a list of video files in accordance with embodiments of the present application is shown, and the device is applicable to a mobile terminal. Corresponding to the flow shown in FIG. 1, the device comprises:

an information storage unit 301, which is used for, when video files are imported into a mobile terminal, invoking a system interface program of the mobile terminal to scan the imported video files; if the scanning is successful, obtaining attribute information of the video files through the system interface program, and storing the same in a system database of the mobile terminal; and if the scanning is not successful, invoking a custom interface program to obtain the attribute information of the video files, and storing the same in a custom database; and a video file list generation unit 302, which is used for, when it is required to generate a list of video files, obtaining the stored attribute information of the respective video files from the system database and the custom database respectively; and generating a list of video files based on the attribute information of the respective video files obtained from the system database and the custom database.

Generally, the attribute information of a video file may comprise at least: path information of the video file and/or a name of the video file. In practical application, it may also comprise the size information of the video file and/or the type information of the video file and so on.

Figure 4:
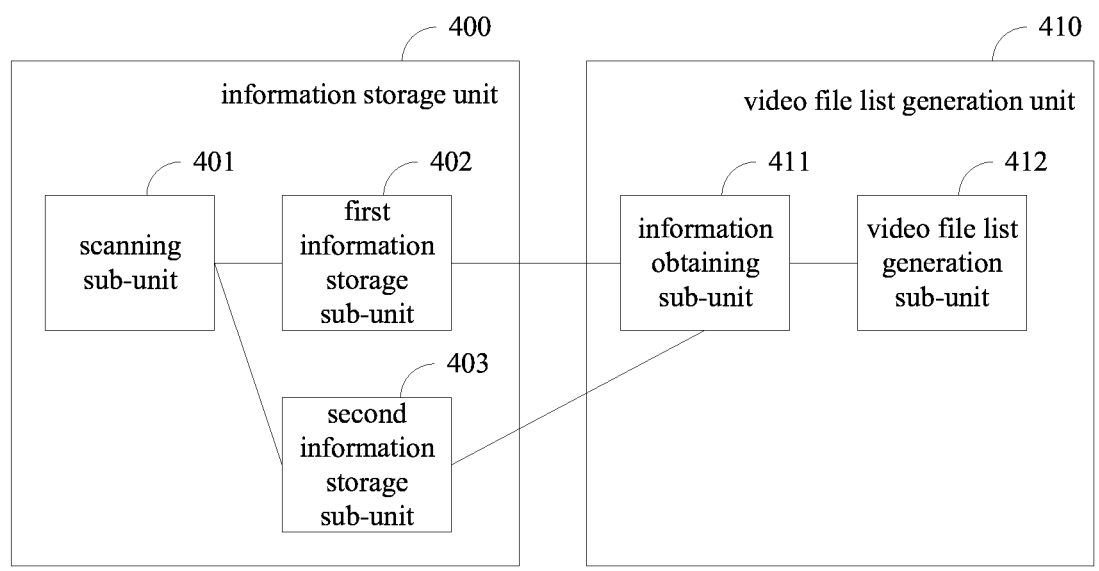
FIG. 4 is another structural diagram of a device for generating a list of video files in accordance with embodiments of the present application.

Referring to FIG. 4, another structural diagram of a device for generating a list of video files by a mobile terminal in accordance with embodiments of the present application is shown, wherein the device is applicable to a mobile terminal. Corresponding to the flow shown in FIG. 2, the device also comprises: an information storage unit 400 and a video file list generation unit 410, wherein:

the information storage unit 400 comprises: a scanning sub-unit 401, a first information storage sub-unit 402 and a second information storage sub-unit 403.

The scanning sub-unit 401 is used for, when the video files are imported into the mobile terminal, invoking the system interface program of the mobile terminal to scan the imported video files.

The first information storage sub-unit 402 is used for, if the scanning is successful, obtaining the attribute information of the video files through the system interface program, and storing the same in the system database of the mobile terminal.

The second information storage sub-unit 403 is used for, if the scanning is not successful, invoking the custom interface program to obtain the attribute information of the video files, and storing the same in the custom database.

Specifically, the second information storage sub-unit 403 of the present embodiment may comprise: an attribute information obtaining sub-unit and a custom database storage sub-unit (not shown in FIG. 4). The attribute information obtaining sub-unit is used for invoking the custom interface program to use a public interface function for obtaining the attribute information of the video files. The custom database storage sub-unit is used for determining whether the custom database is created; if yes, storing the obtained attribute information of the video files in the custom database; if not, after the custom database is created by the custom interface program, storing the obtained attribute information of the video files in the custom database.

In this embodiment, the custom database is created by the custom interface program. In practical application, the custom database is not necessarily created by the foregoing custom interface program, it is also possible to preset a custom database.

The video file list generation unit 410 in FIG. 4 may comprise: an information obtaining sub-unit 411 and a video file list generation sub-unit 412. The information obtaining sub-unit 411 is used for, when it is required to generate a list of video files, obtaining the stored attribute information of the respective video files from the system database and the custom database respectively. The video file list generation sub-unit 412 is used for generating the list of video files based on the attribute information of the respective video files obtained from the system database and the custom database.

Specifically, there may be various implementation methods for implementing the video file list generation sub-unit 412, for example:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database, and so on.

It can be seen that the list of video files generated in this way can reflect all video files in a mobile terminal. A user can operate all video files by a list of video files, thereby the use thereof is convenient.

The embodiments of the present application also disclose a mobile terminal, which comprises: a processor, a memory, communication interfaces and a bus;

the processor, the memory and the communication interfaces are connected and communicate via the bus with each other;

the memory stores executable codes;

the processor carries out a program corresponding to the executable codes by reading the executable codes stored in the memory to perform the method for generating a list of video files provided by the embodiments of the present application, wherein the method for generating a list of video files provided by the embodiments of the present application may comprises:

when video files are imported into a mobile terminal, invoking a system interface program of the mobile terminal to scan the imported video files;

if the scanning is successful, obtaining attribute information of the video files through the system interface program, and storing the same in a system database of the mobile terminal;

if the scanning is not successful, invoking a custom interface program to obtain the attribute information of the video files, and storing the same in a custom database;

when it is required to generate a list of video files, obtaining the stored attribute information of the respective video files from the system database and the custom database respectively; and generating a list of video files based on the attribute information of the respective video files obtained from the system database and the custom database.

In particular, the step of invoking a custom interface program to obtain the attribute information of the video files comprises:

invoking a custom interface program to use a public interface function for obtaining the attribute information of the video files.

In particular, the custom database is created by the custom interface program.

In particular, the step of storing in a custom database comprises:

determining whether the custom database is created; if yes, storing the obtained attribute information of the video files in the custom database; and if not, after the custom database is created by the custom interface program, storing the obtained attribute information of the video files in the custom database.

In particular, the step of generating a list of video files based on the attribute information of the respective video files obtained from the system database and the custom database comprises:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database.

In particular, the attribute information of the video files may comprise at least: path information of the video files and/or names of the video files.

The embodiments of the present application also provide a storage medium for storing application programs, wherein the application programs are used for implementing the method for generating a list of video files provided by the embodiments of the present application. The method for generating a list of video files provided by the embodiments of the present application may comprise:

when video files are imported into a mobile terminal, invoking a system interface program of the mobile terminal to scan the imported video files;

if the scanning is successful, obtaining attribute information of the video files through the system interface program, and storing the same in a system database of the mobile terminal;

if the scanning is not successful, invoking a custom interface program to obtain the attribute information of the video files, and storing the same in a custom database;

when it is required to generate a list of video files, obtaining the stored attribute information of the respective video files from the system database and the custom database respectively; and generating a list of video files based on the attribute information of the respective video files obtained from the system database and the custom database.

In particular, the step of invoking a custom interface program to obtain the attribute information of the video files comprises:

invoking a custom interface program to use a public interface function for obtaining the attribute information of the video files.

In particular, the custom database is created by the custom interface program.

In particular, the step of storing in a custom database comprises:

determining whether the custom database is created; if yes, storing the obtained attribute information of the video files in the custom database; and if not, after the custom database is created by the custom interface program, storing the obtained attribute information of the video files in the custom database.

In particular, the step of generating a list of video files based on the attribute information of the respective video files obtained from the system database and the custom database comprises:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database.

The embodiments of the present application also provide an application program, which is used for implementing the method for generating a list of video files provided by the embodiments of the present application. The method for generating a list of video files provided by the embodiments of the present application may comprise:

when video files are imported into a mobile terminal, invoking a system interface program of the mobile terminal to scan the imported video files;

if the scanning is successful, obtaining attribute information of the video files through the system interface program, and storing the same in a system database of the mobile terminal;

if the scanning is not successful, invoking a custom interface program to obtain the attribute information of the video files, and storing the same in a custom database;

when it is required to generate a list of video files, obtaining the stored attribute information of the respective video files from the system database and the custom database respectively; and generating a list of video files based on the attribute information of the respective video files obtained from the system database and the custom database.

In particular, the step of invoking a custom interface program to obtain the attribute information of the video files comprises:

invoking a custom interface program to use a public interface function for obtaining the attribute information of the video files.

In particular, the custom database is created by the custom interface program.

In particular, the step of storing in a custom database comprises:

determining whether the custom database is created; if yes, storing the obtained attribute information of the video files in the custom database; and if not, after the custom database is created by the custom interface program, storing the obtained attribute information of the video files in the custom database.

In particular, the step of generating a list of video files based on the attribute information of the respective video files obtained from the system database and the custom database comprises:

generating the list of video files in an order of the attribute information of the video files obtained from the system database being followed by the attribute information of the video files obtained from the custom database; or generating the list of video files in an order of the attribute information of the video files obtained from the custom database being followed by the attribute information of the video files obtained from the system database; or generating the list of video files ordered according to a certain kind of preset attribute information in the attribute information of the respective video files obtained from the system database and the custom database.

In particular, the attribute information of the video files comprises at least: path information of the video files and/or names of the video files.

The above mentioned embodiments are only the preferred ones of the present application, thereby they cannot be used to limit the present application, as a result, any modifications, equivalent alterations and improvements made in accordance with the spirit and the principle of the present application still belong to the scope of the present application.

What is claimed is:

1. A method for generating a list of video files, which is applicable to a mobile terminal, characterized in that the method comprises:

when video files are imported into a mobile terminal, invoking a media scanning interface of the operating system of the mobile terminal to scan the imported video files so as to obtaining attributes of the imported video files that are supported by the operating system, and storing the same in a system database of the mobile terminal, the attributes of the video files comprising paths of the video files and/or names of the video files;

for video files that cannot be supported by the operating system, invoking a custom interface program to obtain the attributes of these unsupported video files, and storing the same in a custom database;

when it is required to generate a list of video files, obtaining the stored attributes of the respective video files from the system database and the custom database respectively; and generating a list of video files based on the attributes of the respective video files obtained from the system database and the custom database.

2. The method according to claim 1, characterized in that the step of invoking a custom interface program to obtain the attributes of the unsupported video files comprises:

invoking a custom interface program to use a public interface function for obtaining the attributes of the unsupported video files.

3. The method according to claim 1, characterized in that the custom database is created by the custom interface program.

4. The method according to claim 3, characterized in that the step of storing in a custom database comprises:

determining whether the custom database is created; if yes, storing the obtained attributes of the video files in the custom database; and if not, after the custom database is created by the custom interface program, storing the obtained attributes of the video files in the custom database.

5. The method according to claim 1, characterized in that the step of generating a list of video files based on the attributes of the respective video files obtained from the system database and the custom database comprises one of the following steps:

generating the list of video files in an order of the attributes of the video files obtained from the system database being followed by the attributes of the video files obtained from the custom database;

generating the list of video files in an order of the attributes of the video files obtained from the custom database being followed by the attributes of the video files obtained from the system database;

generating the list of video files ordered according to a certain kind one of preset the attributes of the respective video files obtained from the system database and the custom database.

6. A mobile terminal, which comprises: a processor, a memory, communication interfaces and a bus;

the processor, the memory and the communication interfaces are connected and communicate via the bus with each other;

the memory stores executable codes;

the processor carries out a program corresponding to the executable codes by reading the executable codes stored in the memory to perform the following steps:

when video files are imported into a mobile terminal, invoking a media scanning interface of the operating system of the mobile terminal to scan the imported video files so as to obtain attributes of the imported video files through the system interface program that are supported by the operating system, and storing the same in a system database of the mobile terminal, the attributes of the video files comprising paths of the video files and/or names of the video files;

for video files that cannot be supported by the operating system, invoking a custom interface program to obtain the attributes of these unsupported video files, and storing the same in a custom database;

when it is required to generate a list of video files, obtaining the stored attributes of the respective video files from the system database and the custom database respectively; and generating a list of video files based on the attributes of the respective video files obtained from the system database and the custom database.

7. The mobile terminal according to claim 6, characterized in that the step of invoking a custom interface program to obtain the attributes of the unsupported video files comprises:

invoking a custom interface program to use a public interface function for obtaining the attributes of the unsupported video files.

8. The mobile terminal according to claim 6, characterized in that the custom database is created by the custom interface program.

9. The mobile terminal according to claim 6, characterized in that the step of storing in a custom database comprises:

determining whether the custom database is created; if yes, storing the obtained attributes of the video files in the custom database; if not, after the custom database is created by the custom interface program, storing the obtained attributes of the video files in the custom database.

10. The mobile terminal according to claim 6, characterized in that the step of generating a list of video files based on the attributes of the respective video files obtained from the system database and the custom database comprises one of the following steps:
- generating the list of video files in an order of the attributes of the video files obtained from the system database being followed by the attributes of the video files obtained from the custom database;
- generating the list of video files in an order of the attributes of the video files obtained from the custom database being followed by the attributes of the video files obtained from the system database;
- generating the list of video files ordered according to a certain kind one of preset the attributes of the respective video files obtained from the system database and the custom database.

* * * * *

UNITED STATES PATENT AND TRADEMARK OFFICE
CERTIFICATE OF CORRECTION

PATENT NO. : 10,552,481 B2
APPLICATION NO. : 15/321390
DATED : February 4, 2020
INVENTOR(S) : Feng Yun et al.

Page 1 of 1

It is certified that error appears in the above-identified patent and that said Letters Patent is hereby corrected as shown below:

In the Claims

Column 11, Lines 32 and 33, of Claim 1 should read:
video files so as to obtain attributes of the imported video files Column 12, Lines 11 and 12, of Claim 5 should read:
generating the list of video files ordered according to one of the attributes of the respec- Column 12, Line 31, of Claim 6 should read:
that are sup- Column 13, Lines 12 and 13, of Claim 10 should read:
generating the list of video files ordered according to one of the attributes of the respec- Signed and Sealed this
Twenty-fourth Day of March, 2020

Andrei Iancu
*Director of the United States Patent and Trademark Office*